US012745103B2

(12) United States Patent
Kay et al.

(10) Patent No.: US 12,745,103 B2
(45) Date of Patent: Sep. 22, 2026

(54) MULTIBEAM NON-GEOSYNCHRONOUS SATELLITE COMMUNICATION WITHOUT ON-BOARD WAVEFORM PROCESSING

(71) Applicant: Hughes Network Systems, LLC, Germantown, MD (US)

(72) Inventors: Stanley Kay, Gaithersburg, MD (US); Lin-Nan Lee, Potomac, MD (US); Victor Liau, Gaithersburg, MD (US); Liping Chen, Bethesda, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 318 days.

(21) Appl. No.: 18/408,183

(22) Filed: Jan. 9, 2024

(65) Prior Publication Data

US 2025/0113208 A1 Apr. 3, 2025

Related U.S. Application Data

(60) Provisional application No. 63/586,144, filed on Sep. 28, 2023.

(51) Int. Cl.
*H04W 16/28* (2009.01)
*H04W 40/20* (2009.01)
(Continued)

(52) U.S. Cl.
CPC ........... *H04W 16/28* (2013.01); *H04W 40/20* (2013.01); *H04W 84/06* (2013.01); *H04W 88/16* (2013.01)

(58) Field of Classification Search
CPC ..... H04W 16/28; H04W 40/20; H04W 84/06; H04W 88/16
See application file for complete search history.

(56) References Cited

U.S. PATENT DOCUMENTS

2013/0070666 A1* 3/2013 Miller ................ H04B 7/18543 370/326
2021/0297149 A1* 9/2021 Hsieh ................ H04B 7/18504
(Continued)

OTHER PUBLICATIONS

Chuberre, N., et al., "Study on NR to support Non-Terrestrial Networks", Release-15, RP-171450, *3GPP (3rd Generation Partnership Project) TSG (Technical Specification Group) RAN (Radio Access Network) WG1 (Working Group 1), Meeting 88bis*, West Palm Beach, FL, Jun. 5-9, 2017, 5 pages.
(Continued)

*Primary Examiner* — Ashley Shivers
(74) *Attorney, Agent, or Firm* — Kilpatrick Townsend & Stockton LLP

(57) ABSTRACT

Techniques are described herein for non-terrestrial network (NTN) communications via one or more transparent-mode non-geosynchronous (NGSO) satellites. Embodiments extend a terrestrial wireless network (TWN), such as 5G NR, for use with the satellites. Analog feeder uplink and downlink waveforms are formatted to carry forward and return direct-to-device (DtD) signals over respective sub-channel channels, and the subchannels can be assigned with time and frequency dimensions that are compatible with resource block assignments of the TWN protocols. Use of the analog subchannels and time-division multiplexing with beam-hopping facilitates satellite communication of the DtD signals effectively as an extension of the TWN. Embodiments also support communication of satellite control signals as part of the analog feeder uplink waveform, and inter-satellite link (ISL) routing and communication on-board the satellite.

19 Claims, 6 Drawing Sheets

(51) Int. Cl.
*H04W 84/06* (2009.01)
*H04W 88/16* (2009.01)

(56) References Cited

U.S. PATENT DOCUMENTS

| | | | | |
|---|---|---|---|---|
| 2023/0047987 | A1* | 2/2023 | Tseng | H04W 36/08 |
| 2023/0224030 | A1 | 7/2023 | Miller et al. | |
| 2024/0014891 | A1* | 1/2024 | Chen | H04B 7/18513 |
| 2024/0298283 | A1* | 9/2024 | Hu | H04W 72/04 |
| 2025/0080282 | A1* | 3/2025 | Suh | H04L 1/1864 |
| 2025/0234318 | A1* | 7/2025 | Catovic | H04W 12/06 |

OTHER PUBLICATIONS

Chuberre, N., “Study on solutions for NR to support non-terrestrial networks (NTN)”, Release-16, RP-190710, *3GPP (3rd Generation Partnership Project) TSG (Technical Specification Group) RAN (Radio Access Network), Meeting 83*, Shenzen, China, Mar. 18-19, 2019, 6 pages.

Chuberre, N., “Solutions for NR to support non-terrestrial networks (NTN)”, Release-17, RP-211784, *3GPP (3rd Generation Partnership Project) TSG (Technical Specification Group) RAN (Radio Access Network), Meeting #93-e*, e-meeting, Sep. 13-17, 2021, 10 pages.

3GPP (3rd Generation Partnership Project), “Study on using Satellite Access in 5G”, Release-16, Technical Report 22.822, V1.0.0, May 2018, 35 pages.

3GPP (3rd Generation Partnership Project), “Service requirements for the 5G system”, Release-19, Technical Specification 22.261, V19.6.0, Mar. 2024, 142 pages.

Michel, C., “Study on architecture aspects for using satellite access in 5G”, SP-181253, *TSG (Technical Specification Group) SA (System Aspects) Meeting #SP-82*, Sorrento, Italy, Dec. 12-14, 2018, 6 pages.

3GPP (3rd Generation Partnership Project), “Study on architecture aspects for using satellite access in 5G”, Release-17, Technical Report, 23.737, V17.1.0, Jul. 2020, 92 pages.

Michel, C., “Integration of satellite systems in the 5G architecture”, SP-191335, *3GPP (3rd Generation Partnership Project) TSG (Technical Specification Group) SA (System Aspects) Meeting #86*, Sitges, Spain, Dec. 10-13, 2019, 3 pages.

Michel, C., “Study on management and orchestration aspects with integrated satellite components in a 5G network”, SP-190138, *3GPP (3rd Generation Partnership Project) TSG (Technical Specification Group) SA (System Aspects) Meeting #83*, Shenzhen, China, Mar. 20-22, 2019, 3 pages.

Catovic, A., “Ct aspects of 5GC architecture for satellite networks ”, CP-203235, *3GPP (3rd Generation Partnership Project) TSG-CT (Technical Specification Group Core Network and Terminals) Meeting #90e*, e-Meeting, Dec. 6-8, 2020, 4 pages.

3GPP (3rd Generation Partnership Project), “Study on PLMN selection for satellite access”, Release-17, Technical Report, 24.821, V2.0.0, Sep. 2021, 48 pages.

Charbit, G., et al., “Study on NB-lo/eMTC support for Non-Terrestrial Network”, Release-17, RP-193235, *3GPP (3rd Generation Partnership Project) TSG (Technical Specification Group) RAN (Radio Access Network), Meeting #86*, Sitges, Spain, Dec. 9-31, 2019, 4 pages.

Lin, X., et al.,, “5G from Space: An Overview of 3GPP Non-Terrestrial Networks,” in *IEEE Communications Standards Magazine*, vol. 5, No. 4, pp. 147-153, Dec. 2021, doi: 10.1109/MCOMSTD.011.2100038.

Panaitopol, D., et al., “Way Forward on NTN_solutions_Part1”, R4-2115640, *3GPP (3rd Generation Partnership Project) TSG (Technical Specification Group) RAN (Radio Access Network) WG4 (Working Group 4), Meeting #100-e*, e-Meeting, Aug. 16-27, 2021, 21 pages.

ITU-R (International Telecommunication Union Radiocommunication Sector), “Frequency arrangements for implementation of the terrestrial component of International Mobile Telecommunications in the bands identified for IMT in the Radio Regulations”, M. 1036-7 Series, Dec. 2023, 31 pages.

El-Sheikh, S., “Implementation of International Mobile Telecommunications in the frequency bands 1 885-2 025 MHz and 2 110-2 200 MHz”, Resolution 212 (Rev. WRC-19), *The World Radiocommuncation Conference*, 2019, 4 pages.

3GPP (3rd Generation Partnership Project), “Non-Access-Stratum (NAS) functions related to Mobile Station (MS) in idle mode”, Release-18, Technical Specification 23.122, V18.6.0, Mar. 2024, 155 pages.

3GPP (3rd Generation Partnership Project), “Characteristics of the Universal Subscriber Identity Module (USIM) application”, Release-18, Technical Specification 31.102, V18.4.0, Mar. 2024, 396 pages.

“5G and Non-Terrestrial Networks”, *A 5G Americas White Paper*, Feb. 2022, 35 pages.

Khammassi Malek et al: “Preceding for High-Throughput Satellite Communication Systems: A Survey”, IEEE Communications Surveys & Tutorials, IEEE, vol. 26, No. 1, Sep. 19, 2023 (Sep. 19, 2023), pp. 0-118, XP011961661, DOI: 10.1109.

* cited by examiner

MULTIBEAM NON-GEOSYNCHRONOUS SATELLITE COMMUNICATION WITHOUT ON-BOARD WAVEFORM PROCESSING

CROSS REFERENCE TO RELATED APPLICATION

This application claims priority to Provisional U.S. Patent Application No. 63/586,144, filed Sep. 28, 2023, entitled "MULTIBEAM S-BAND LEO WITHOUT WAVEFORM PROCESSING ON-BOARD," the entire disclosure of which is hereby incorporated by reference, for all purposes, as if fully set forth herein.

BACKGROUND

Wireless connectivity continues to evolve to meet demands for ubiquity, convenience, reliability, speed, responsiveness, and the like. For example, each new generation of cellular communication standards, such as the move from 4G/LTE (fourth generation long-term evolution) networks to 5G (fifth generation) networks, has provided a huge leap in capabilities along with new and increasing demands on the infrastructures that enable those networks to operate. For example, 5G supports innovations, such as millimeter-wave frequencies, massive MIMO (Multiple Input Multiple Output), and network slicing, which enhance connectivity for unprecedented numbers of devices and data-intensive applications.

More recently, innovations in 5G networking (and its successors) have expanded from terrestrial-based communication infrastructures to so-called non-terrestrial network (NTN) infrastructures. NTN infrastructures leverage satellites and high-altitude platforms to extend 5G coverage and capabilities, such as to serve remote and otherwise underserved areas. Effective deployment of NTN solutions can help support connectivity and applications for rural users, emergency responders, global Internet-of-Things (IoT) deployments, etc.

However, non-terrestrial communication carry complexities and design concerns that are not present in terrestrial-based communications, which can add significant technical hurdles to NTN deployments. For example, effective ground-to-satellite communications involves accounting for orbital dynamics, handovers and/or other transitions between satellites, path loss, propagation delay, atmospheric conditions, inter-satellite and/or inter-beam interference, spectrum and regulatory considerations, and other considerations. New approaches continue to be developed to find technical solutions for overcoming, or at least mitigating, these and other technical hurdles.

SUMMARY

Embodiments include systems and methods for non-terrestrial network (NTN) communications via one or more transparent-mode non-geosynchronous (NGSO) satellites. Embodiments extend a terrestrial wireless network (TWN), such as 5G NR, for use with the satellites. Analog feeder uplink and downlink waveforms are formatted to carry forward and return direct-to-device (DtD) signals over respective subchannels, and the subchannels can be assigned with time and frequency dimensions that are compatible with resource block assignments of the TWN protocols. Use of the analog subchannels and time-division multiplexing with beam-hopping facilitates satellite communication of the DtD signals effectively as an extension of the TWN.

Embodiments also support communication of satellite control signals as part of the analog feeder uplink waveform, and inter-satellite link (ISL) routing and communication on-board the satellite.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
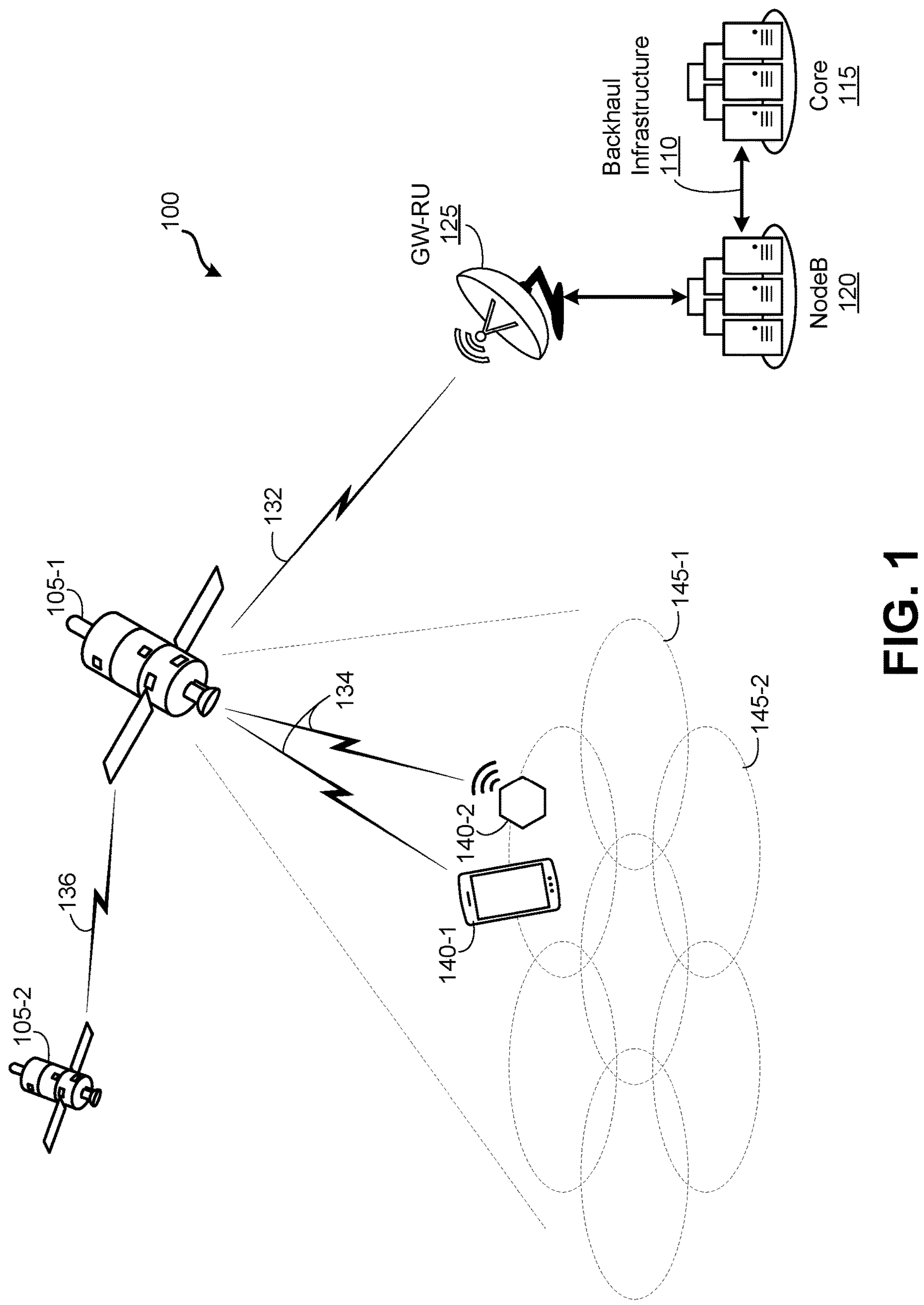
FIG. 1 shows an illustrative non-terrestrial network (NTN) communication system as a context for embodiments described herein.

FIG. 1 shows an illustrative non-terrestrial network (NTN) communication system 100 as a context for embodiments described herein. The NTN communication system 100 generally provides wireless connectivity to a large number of user terminals 140 via an NTN architecture that enables extension of a next-generation terrestrial wireless (e.g., cellular) network via one or more satellites 105 (e.g., a constellation of satellites 105). The NTN communication system 100 facilitates direct-to-device (DtD) communications over satellite(s) 105 to the user terminals 140 based on next-generation cellular waveforms and protocols.

As illustrated, embodiments of the terrestrial wireless network (TWN) include a core network 115 and a NodeB 120 in communication via a backhaul infrastructure 110. Embodiments are implemented in the context of 5G new radio (NR) networks, and their related waveforms, protocols components, etc. For example, the core network 115 is described as a 5G core network (5GC), and the NodeB 120 is described as a next-generation NodeB (gNB). These descriptions are intended for added clarity, and not to limit the implementation of embodiments only to the 5G NR context. Indeed, techniques described herein can be modified to accommodate other (e.g., subsequent) versions and generations of architectures, such as fourth generation (4G) long-term evolution (LTE), sixth generation (6G), seventh generation (7G), etc. The terms "5G" and "5G NR" are used interchangeably herein.

As noted above, the core network 115 can be implemented as a 5GC. The core network 115 generally includes critical network and management functions. For example, the core network 115 can include an access and mobility management function (AMF) to manage the mobility of user devices, including registration, session management, mobility anchoring, and the like; a session management function (SMF) to handle session establishment, session modification, session termination, IP address assignment, QoS parameters, and the like; a user plane function (UPF) to handle packet routing, packet forwarding, traffic optimization, and the like; an authentication server function (AUSF) to handle user authentication and authorization; a user data management (UDM) function to handle subscriber data, subscription information, authentication credentials, policy rules, and the like; a network slice selection function (NSSF) to handle slice creation, slice destruction, slice customization, and the like; and/or other functions. The various components of the core network 115 can be implemented as physical devices and/or as virtualized network functions.

As noted above, the NodeB 120 can be implemented as a gNB (evolved from the enhanced NodeB (eNB) of 4G/LTE networks). Embodiments of the NodeB 120 can provide an interface between satellite gateways and the core network 115 to manage radio resource and facilitate connections between user devices 140 and the core network 115. In the illustrated NTN context, the satellite gateways are implemented as gateway radio units (GW-RUs) 125. The interface between the NodeB 120 and the core network 115 can be implemented as a "next-generation" (NG) interface that implements protocols, such as the Next-Generation Radio Access Network (RAN) Application Part (NGAP) protocol. Embodiments of the NodeB 120 can facilitate the packet data convergence protocol (PDCP) to handle header compression and encryption/decryption of user data packets; a radio link control (RLC) to handle segmentation, reassembly, and error correction of data packets between the NodeB 120 and user devices 140; medium access control (MAC) to schedule and prioritize data transmissions between the NodeB 120 and user devices 140 (e.g., to optimize radio resources); physical (PHY) layer functions, including modulation, coding, and transmission of radio signals; and other functions.

Embodiments of the NodeB 120 further include components referred to as one or more radio units (RU), central units (CU), and distributed units (DU). The RU generally handles PHY layer functions, such as radio signal transmission and reception. For example, the RU can convert digital streams into analog streams, which it can then modulate and encode for communication as RF signals via the GW-RUs 125; and/or the RU can convert analog streams from the GW-RUs 125 into digital streams, which it can then demodulate and decode for communication to the core network 115. The CU generally handles control plane functions, such as scheduling, handovers, radio resource management, etc. Typically, the CU facilitates centralized control and coordination of multiple RUs, connects with multiple DUs to coordinate and optimize radio resources, and interfaces with core network 115 functions (e.g., via the NG interface). The DU generally handles distributed processing of baseband functions, including baseband processing tasks related to the PHY layer (e.g., modulation and coding) and the MAC layer (e.g., scheduling and prioritization of user data in the time and frequency domains), and implementation of RLC and PDCP processing tasks.

Though not explicitly shown, the backhaul infrastructure 110 can include additional components and/or functions. Embodiments of the backhaul infrastructure 110 can include a transport network (e.g., fiber optics, terrestrial microwave, etc.) to facilitate high-speed, high-throughput, high-reliability communications between the NodeBs 120 and the core network 115. Some embodiments of the backhaul infrastructure 110 also include connections between NodeBs 120 (e.g., so-called "Xn" interfaces) to facilitate handovers, or the like. Some embodiments of the backhaul infrastructure 110 include fronthaul interfaces to facilitate coordination and communication between components of the NodeB 120 when implemented with distributed or split architectures. For example, the fronthaul interface can enable communications between distributed CUs and DUs. Embodiments of the backhaul infrastructure 110 can further include components to implement synchronization (e.g., to coordinate between NodeBs 120), security protocols, network segmentation and/or isolation, network orchestration (e.g., an operations support system (OSS)), end-to-end business functions (e.g., a business support system (BSS)), virtualization functions (e.g., for software-defined networking, network function virtualization, etc.), and/or other functions.

As described herein, the NTN communication system 100 expands the terrestrial wireless network (TWN) provide DtD communications with user devices 140 via satellite links. The satellite(s) 105 described herein are non-geosynchronous orbit (NGSO) satellites that do not perform any waveform processing on board (i.e., they are "non-processing" satellites) and use beamforming and beam-hopping to service the user terminals 140. As used herein, phrases like "non-processing satellite," "do not perform any waveform processing on board," and the like mean that the satellite does not perform any processing relating to modulation, coding, and/or other wireless-waveform-specific signal processing, except for frequency conversion, amplification, routing, and analog-to-digital or digital-to-analog conversion. In general, geostationary Earth orbit (GEO) satellites remain stationary over a fixed point on the Earth. In contrast, NGSO satellites orbit the Earth, so that their position above the Earth is constantly changing according to an orbital path. The orbital path can be inclined or polar. The orbital path is considered to be "polar" if it falls in an orbital plane that is nearly perpendicular to the equator, and the orbital path is considered to be "inclined" otherwise. For example, satellites following polar orbital paths tend to travel primarily in north-south directions, and satellites following inclined polar orbital paths tend to travel primarily in east-west directions. Embodiments described herein are applicable to NGSO satellite(s) 105 in both polar and inclined orbits.

The NGSO satellite(s) 105 can operate at low Earth orbit (LEO) or medium Earth orbit (MEO). LEO altitudes typically range from approximately 180 and 2,000 kilometers, and IEO altitudes typically range from approximately 2,000 to 35,786 kilometers. In some implementations, LEO satellite(s) 105 operate at orbital altitudes of approximately 500 to 1,400 kilometers. To achieve larger capacity, embodiments of the NGSO satellites 105 are implemented with large direct radiating antennas (DRAs), which can form dozens, or up to hundreds, of beams corresponding to cells 145 on the ground. Each DRA distributes the total power it transmits among a subset of these beams during each transmission interval. For example, a larger DRA can produce more power, which can support a larger number of beams for illuminating a larger number of cells 145 and can facilitate more frequency reuse.

The NGSO satellite(s) 105 can communicate with one or more GW-RUs 125 via one or more feeder links 132. Although only one GW-RU 125 is shown, it is assumed that the NTN communication system 100 includes a large number of geographically distributed GW-RUs 125. As an NGSO satellite 105 tracks across the surface of the Earth along its orbital path, it will successively move into and out of line-of-sight (LoS) with respect to different ones of the GW-RUs 125. For example, in a first timeframe, an antenna of a first GW-RU 125 can see the NGSO satellite 105; in a second timeframe, the antenna of the first GW-RU 125 can no longer see the NGSO satellite 105, but the antenna of a second GW-RU 125 can see the NGSO satellite 105. As such, maintaining communication between the GW-RUs 125 and the NGSO satellite 105 can involve relatively frequent feeder-link handoffs, hand-overs, and/or other types of transitions.

Each GW-RU 125 is a ground-based facility that serves as an interface between the NGSO satellite(s) 105 and a terrestrial wireless network (including the NodeB 120, the core network 115, and the backhaul infrastructure 110). Each GW-RU 125 includes an antenna designed to track the NGSO satellites 105 as they traverse their orbital paths. To facilitate such tracking, each GW-RU 125 can include electromechanical tracking components, processors to implement tracking and compensation algorithms, and/or other suitable components. The antennas can operate in any suitable satellite frequency band to support feeder-link communications, such as in the Ka-band or Ku-band. In some implementations, each feeder link 132 operates in the Ka-band frequency range of approximately 26.5 gigahertz (GHz) to 40 GHz. In one implementation, the uplink portion of the feeder link 132 (i.e., Earth-to-space) is in the range of approximately 24.75 to 25.25 GHz (or 27.5 to 28.6 GHz, or 29.1 to 30.0 GHz), and the downlink portion of the feeder link 132 (i.e., space-to-Earth) is in the range of approximately 18.8 to 20.2 GHz. Other embodiments can use other bands, such as the Q-band (33 to 50 GHz), the V-band (40 to 75 GHz), and/or the E-band (60 to 90 GHz).

Each GW-RU 125 can further include any suitable radiofrequency (RF) equipment for transmission and reception over the feeder link(s) 132, such as RF transceivers, amplifiers, demodulators, filters, etc. Each GW-RU 125 can further include any suitable equipment for interfacing with the TWN, such as signal processing equipment (e.g., modems) for converting data streams between those suitable for the feeder link(s) 132 and those suitable for the TWN infrastructure, network interface components (e.g., to support optical fiber, microwave, or other communication links), etc.

Embodiments of the NGSO satellites 105 also communicate with user terminals 140 via user links 134. As an NGSO satellite 105 moves, it can use beamforming to form beams that illuminate cells 145 on the ground, and each cell 145 has a respective cell coverage area. Any user devices 140 in the cell coverage area of one of the illuminated cells 145 is potentially able to establish communications with the NGSO satellite 105 via a corresponding user link 134. The user links can use any suitable portion of the electromagnetic spectrum. Some embodiments of the user links 134 operate in the S-band, which encompasses frequencies ranging from approximately 2 to 4 GHz. In one implementation, the uplink portion of the user link 134 (i.e., Earth-to-space) is in the range of approximately 1,980 to 2,025 MHz, and the downlink portion of the user link 134 (i.e., space-to-Earth) is in the range of approximately 2,126 to 2,200 MHz. The S-band tends to be well-suited for mobile satellite services (MSS), such as communications between mobile devices and satellites for various reasons, such as the ability to use antenna sizes that are reasonable and practical for such applications, the tendency of S-band to provide relatively good atmospheric penetration, etc. Other embodiments can use other suitable frequency ranges below 6 GHz for the user links 134.

FIG. 1 depicts the user devices 140 as a smartphone (140-1) and an Internet-of-things (IoT) device (140-2). Embodiments can concurrently support communications with very large numbers (e.g., millions) of user devices 140, and the user devices 140 can include any suitable types of user devices 140. For example, the user devices 140 can include smartphones, satellite phones and other personal communicator devices, satellite radios, satellite television receivers, global positioning system (GPS) receivers, IoT asset and/or wildlife tracking tags, IoT environmental and/or other sensors, scientific research instruments, etc.

In general, communications from the TWN to the user devices 140 are referred to as "forward-link" communications, and communications from the user devices 140 to the TWN are referred to as "return-link" communications. For example, a forward-link communication passes from a GW-RU 125 to an NGSO satellite 105 via an uplink portion of the feeder link 132 and back down to a user device 140 via a downlink portion of the user link 134. A return-link communication passes from a user device 140 to the NGSO satellite 105 via an uplink portion of the user link 134 and back down to the GW-RU 125 via a downlink portion of the feeder link 132.

Embodiments of the NTN communication system 100 include a constellation of NGSO satellites 105. Such a constellation can include a large number of NGSO satellites 105 in one or more orbital planes, with one or more inclination angles, at one or more orbital altitudes, etc. As one example, the constellation can include 40 orbital planes with 25 NGSO satellites 105 in each orbital plane. Other examples of constellations can include thousands of NGSO satellites 105 in tens of planes to effectively provide continuous coverage of almost the entire surface of the Earth. Embodiments of the NGSO satellites 105 can communicate with adjacent ones of the NGSO satellites 105 in the constellation using inter-satellite links (ISLs) 136. For example, suppose NGSO satellite 105-1 is currently in communication with a GW-RU 125, but an adjacent NGSO satellite 105-2 is not in currently in communication with any GW-RUs 125 (e.g., it is currently over the ocean, in a geographic location without a GW-RU 125, over a GW-RU 125 that is not functioning, etc. NGSO satellite 105-2 may be able to communicate with the TWN via NGSO satellite 105-1 by using an ISL link 136.

Typically, ISLs 136 are implemented as digital RF or optical links. In some cases, an ISL can be implemented as an analog RF link. Embodiments described herein can operate with any of these, or any other suitable type of ISL 136. In some embodiments, one or more of the NGSO satellites 105 in a constellation can be implemented with two ISLs 136, one to communicate with the adjacent NGSO 105 ahead of it in the same orbital plane, and another to communicate with the adjacent NGSO 105 behind it in the same orbital plane (i.e., two inter-plane ISLs). In some embodiments, one or more of the NGSO satellites 105 in a constellation can be implemented with one or two ISLs 136 to communicate with adjacent NGSO satellites 105 in one or both adjacent orbital planes (i.e., intra-plane ISLs). Using the ISLs 136, the NGSO satellites 105 can effectively form a mesh network. In some embodiments, almost full global coverage can be continuously achieved with a maximum of two hops using both inter-plane and intra-plane ISLs. In other embodiments, almost full global coverage can be continuously achieved with a maximum of three hops using only inter-plane ISLs.

As noted above, the NTN communication system 100 seeks to provide DtD communications to user devices 140 by extending terrestrial wireless network (TWN) infrastructures (e.g., including associated waveforms, protocols, and the like) to accommodate satellite characteristics, such as Doppler and propagation delay. It is generally assumed herein that the user devices 140 are designed, in accordance with the TWN infrastructure, to communicate using TWN waveforms and protocols. In typical terrestrial-only (e.g., cellular) wireless communication infrastructures, user devices 140 typically communicate with terrestrial antennas (e.g., cell towers) in communication with terrestrial NodeBs that handle waveform processing.

When extending such an infrastructure to accommodate satellite links, there are essentially three categories of options for how to perform the waveform processing: completely on-board the satellite, partially on-board the satellite and partially on the ground, or completely on the ground. Typical conventional approaches tend to use on-board satellite processing capabilities of satellites to move some or all of the waveform processing (i.e., to move some or all of the NodeB functions) to the satellite. For example, the Third Generation Partnership Project (3GPP) Release 17 standards specify an NTN NR architecture in a so-called "transparent mode," whereby waveform processing is performed on the ground for feeder-link (i.e., ground-to-satellite) communications, and no waveform processing is performed on-board the satellite for user-link (i.e., user device-to-satellite) communications. No specific feeder-link design is discussed there, although it can generally be assumed that: the waveform may be digitized and transmitted with digital modulation and coding based on common satellite-related standards, such as DVB-S2/S2X (e.g., because of their power efficiency and performance); and the analog waveform may be sent as it is for a single beam. For multi-beam satellites with dozens or even hundreds of beams, however, such options are incompatible with practical feeder-link bandwidth and throughput constraints.

Another category of approach is to move part of the 3GPP NR processing on-board the satellite. Adopting the general architecture for Node B used in terrestrial cellular networks, as discussed above, the waveform processing can be partitioned into RUs, DUs, and CUs. Some such approaches can move all or part of the RU function to the satellite, keeping the DU functions in the GW-RU, and the CU functions in a more centralized ground network. In such an approach, RU-to-DU communications can follow the cellular network practice of using enhanced common public radio interface (eCPRI) fronthaul protocols. The eCPRI protocols provide several options for splitting between on-board 5G NR functions and gateway functions. In such an approach, the physical layer of the feeder-link would typically be digital and formatted as a DVB-S2/S2X waveform. While such an approach can be effective, even moving only the RU functions to the satellite can add appreciable power requirements, complexity, etc. to the satellite.

Embodiments herein perform all waveform processing in a ground-based NodeB 120, as illustrated in FIG. 1. Because the NGSO satellites 105 are implemented herein as non-processing satellites, the waveform sent down from an NGSO satellite 105 to the user devices 140 is substantially the same as when that waveform was sent from the GW-RU 125 to the NGSO satellite 105. Thus, the NodeB 120 is configured essentially to consider the entire path from the GW-RUs 125 to the user devices 140 as transparent and to perform waveform processing accordingly.

As one example embodiment, the user devices 140 are configured to communicate over the S-band in accordance with 5G NR waveforms and protocols. In such an embodiment, a signal received by a user device 140 from an NGSO satellite 105 is an orthogonal frequency-division-multiplexed (OFDM) signal encoding digital information in an analog waveform. Architecting the NTN communication system 100 so that the NGSO satellite 105 relaying this signal does not perform waveform processing on the signal involves making sure that the signal sent up to the NGSO satellite 105 is the same OFDM signal encoding the same digital information in the same analog waveform. As such, embodiments of the ground-based NodeB 120 are tasked with generating this waveform. In the TWN, a 5G digital signal is received by the NodeB 120 (a gNB in the 5G case) from the 5G core network 115. The NodeB 120 applies modulation and coding schema to convert the digital information and error corrected bits into complex (I, Q) symbols representing the modulation type (e.g., quadrature phase shift keying (QPSK), 16-amplitude phase shift keying (16APSK), etc.). At this stage, the signal is still a digital signal, but the encoding is different from the original information bits. The NodeB 120 can then run the digital symbols through digital-to-analog (D/A) converters, which converts the signal to an analog signal representing the digitally encoded information. Embodiments of the NodeB 120 can then send the signal to an appropriate GW-RU 125. The GW-RU 125 can frequency-convert (e.g., up-convert) the analog signal to an appropriate satellite feeder-link frequency, such as to a carrier frequency in the Ka-band. The GW-RU 125 can then send the analog feeder-link signal (i.e., the forward uplink signal) to the NGSO satellite 105.

Figure 2:
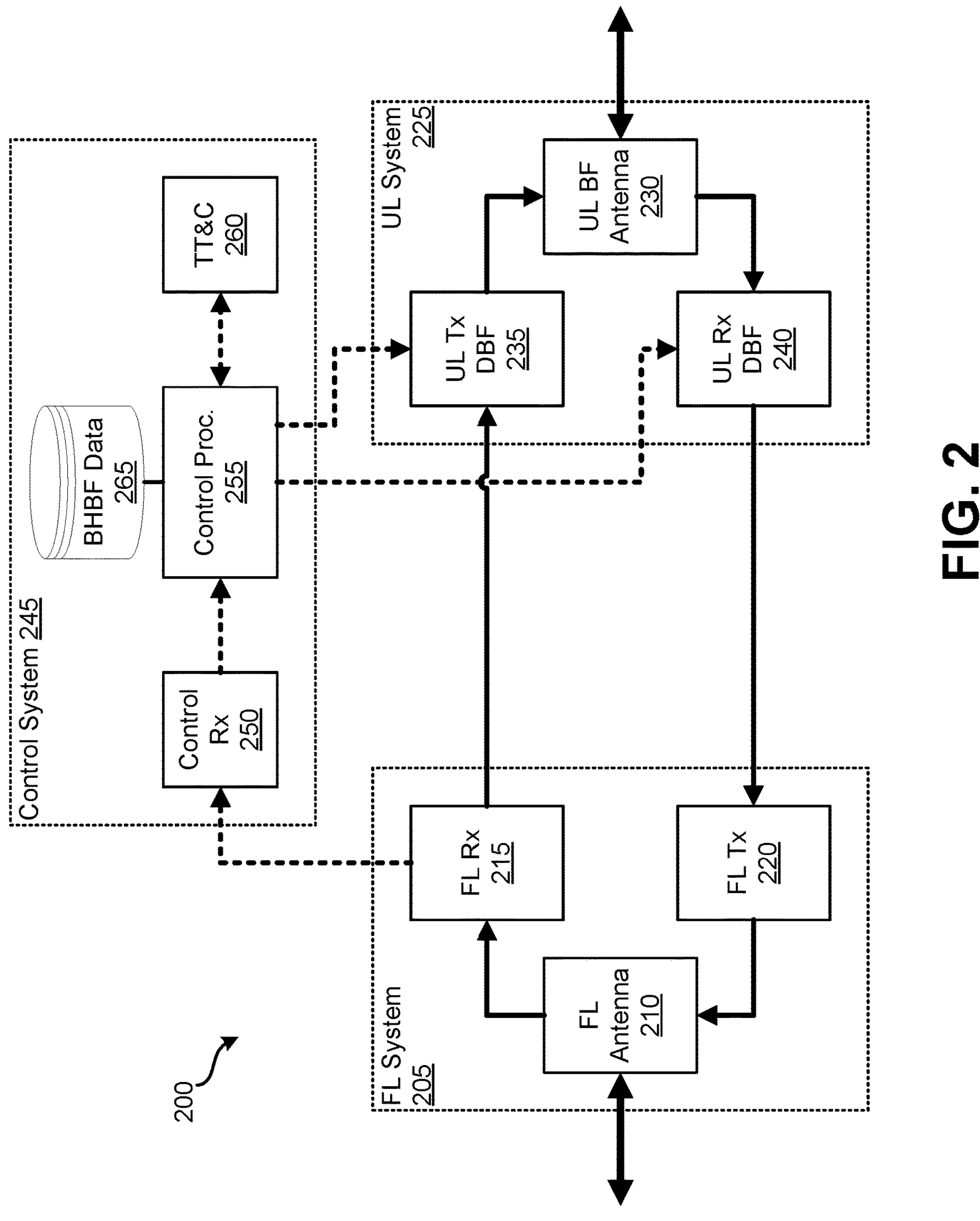
FIG. 2 shows a block diagram of a first illustrative on-board signal handling architecture, according to some embodiments described herein.

Implementing such an NTN communication system 100 with all waveform processing on the ground can involve a novel architecture for the NGSO satellite(s) 105. FIG. 2 shows a block diagram of a first illustrative on-board signal handling architecture 200, according to some embodiments described herein. The architecture 200 can be implemented in one or more (e.g., or all) of the NGSO satellite(s) 105 of the NTN communication system 100 of FIG. 1. As illustrated, the architecture 200 includes a feeder link (FL) system 205, a user link (UL) system 225, and a control system 245.

Embodiments of the FL system 205 include a FL receiver (Rx) 215 to receive forward uplink signals from a currently active GW-RU (e.g., GW-RU 125 of FIG. 1) via a FL antenna 210. Embodiments of the FL Rx 215 can include any suitable components to facilitate conveying received signals from the FL antenna 210 to other components of the architecture 200. For example, the FL Rx 215 can include a low-noise amplifier (LNA), one or more downconverters (e.g., to convert to an intermediate frequency (IF) band, to a baseband frequency, or to any other suitable frequency), and one or more filters (e.g., for selecting desired frequency bands and rejecting unwanted signals or noise). In some embodiments, the output of FL Rx 215 is one or more streams of digital complex samples generated by one or more analog-to-digital converters (ADCs) of the FL Rx 215. Some embodiments can include additional components, such as monitoring systems to measure and monitor signal quality, equipment health, and/or other parameters.

Embodiments of the FL system 205 also include a FL transmitter (Tx) 220 to transmit return downlink signals to the currently active GW-RU 125 via the FL antenna 210. Embodiments of the FL Tx 220 can include any suitable components to facilitate conveying signals from upstream components of the architecture 200 to the FL antenna 210, such as one or more digital-to-analog converters (DACs) to convert one or more received digital sample streams into analog signals for transmission. For example, the FL Tx 220 can include an upconverter to convert return signals to an appropriate feeder-link frequency, a high-power amplifier (HPA) for amplifying the signals (e.g., to overcome atmospheric attenuation, path loss, etc.), one or more filters (e.g., to ensure that the transmitted signals are within allocated frequency bands), a modulator to modulate signals onto a desired carrier, etc.

In some embodiments, the FL system 205 further includes the FL antenna 210. In context of NGSO satellites 105, embodiments of the FL antenna 210 are designed to maintain seamless communication with the ground (i.e., with GW-RUs 125) as the NGSO satellites 105 traverses its orbital path. For example, the FL antenna 210 can perform beam steering to maintain pointing of a high-power beam in the direction of a currently active GW-RU 125. Such beam steering can be performed mechanically (e.g., using gimbals, etc.) or electronically (e.g., using a phased array antenna). Embodiments of the FL antenna 120 include radiating elements to emit and/or receive FL signals, tracking components to accurately determine the positions of GW-RUs 125 and to adjust beam directions accordingly, control components (e.g., for beamforming, tracking, etc.), and/or any other suitable components. In some implementations, the FL antenna 210 can include some or all of the components described as part of the FL Rx 215 and/or the FL Tx 220. For example, the FL antenna 210 can include one or more LNAs, HPAs, transceiver modules, filters, frequency converters, etc. Where the FL antenna 210 is a phased array antenna, embodiments can further include a beamforming network of phase shifters and amplifiers to dynamically control the phases and amplitudes of signals across the radiating elements to effectively shape and steer one or more antenna beams.

Although only one FL antenna 210 is shown, the FL antenna 210 can include multiple antennas. For example, as described above, the NGSO satellites 105 traverse an orbital path. As such, a particular NGSO satellite 105 will sequentially enter and leave line-of-sight regions of different GW-RUs 125 over time so that maintaining communications between the ground and the NGSO satellite 105 involves frequently handing the communications over from one GW-RU 125 to the next in sequence along the NGSO satellite's 105 path. In anticipation of such handovers, while one of the FL antennas 210 is in communication with a currently active GW-RU 125 (i.e., the one of the GW-RUs 125 currently communicating feeder-link signals with the NGSO satellite 105), one or more other FL antennas 210 can be initiating communications with a next GW-RU 125 to facilitate a smooth handover with minimal interruption or delay.

Embodiments of the UL system 225 include a UL Tx digital beamformer (DBF) 235 and a UL Rx DBF 240 in communication with a UL beamforming (BF) antenna 230. Embodiments of the UL Tx DBF 235 direct the UL BF antenna 230 to form a large number (e.g., 128) of forward user beams in accordance with beam-hopping beamforming (BHBF) schema and to transmit forward downlink signals to user devices 140 located in cell coverage areas serviced by the forward user beams. Similarly, embodiments of the UL Rx DBF 240 direct the UL BF antenna 230 to form a large number (e.g., 128) of return user beams in accordance with the BHBF schema and to receive return uplink signals from the user devices 140 located in cell coverage areas serviced by the return user beams.

Embodiments of the UL BF antenna 230 dynamically form and steer beams to communicate with user devices 140 on the ground. Each formed beam illuminates a corresponding beam coverage area. User devices 140 can be considered as being in particular cell coverage areas, and each cell coverage area can coincide with one or more beam coverage areas. In some embodiments, a cell coverage area corresponds to a substantially fixed geographic area of the Earth's surface. Although the positions of the NGSO satellites 105 are constantly changing with respect to any particular cell coverage area, proper coordination of beamforming, beam steering, beam-hopping, and the like can ensure that one or more beams (e.g., several beams) are illuminating the cell coverage area at all times to effectively provide seamless communications to user devices 140 in that cell coverage area. Such beamforming, beam steering, and beam-hopping are performed by the UL Tx DBF 235 and the UL Rx DBF 240 applying BHBF schema to the UL BF antenna 230. Embodiments of the UL BF antenna 230 are implemented as a phased array of radiating elements. Alternatively, the UL BF antenna 230 can be implemented using any suitable configuration capable of beamforming and beam-hopping, such as metamaterial-based antennas.

Embodiments of the UL Tx DBF 235 include digital signal processing (DSP) elements to apply specific phase shifts and weights (or only phase shifts) to the signals, and digital-to-analog converters (DACs) to convert those signals for sending to individual radiating elements within the antenna array, thereby concurrently forming multiple directional beams pointed and focused to particular spots on the Earth's surface. Similarly, embodiments of the UL Rx DBF 240 include DSP elements to dynamically adjust phase shifts and amplitudes, thereby adjusting the reception pattern of receiving antenna elements of the phased array to enhance the UL BF antenna's 230 sensitivity in directions corresponding to return user beams. The particular patterns of phase shifts and weights applied to the transmit and receive elements of the UL BF antenna 230 by the UL Tx DBF 235 and the UL Rx DBF 240 are dictated by BHBF schema, as described more fully below.

Embodiments of the control system 245 include a control Rx 250, a control processor 255, and a telemetry tracking and control (TT&C) block 260. In some implementations, the TT&C block 260 communicates with a satellite control function on the ground to monitor signal quality measurements, and the like. For example, the satellite control function can be integrated with and/or in communication with the GW-RU 125. Although the link between the FL system 205 and the control system 245 is shown as one-directional (i.e., from the FL Rx 215 to the control Rx 250), some embodiments can include a feedback path from the control system 245 to the FL system 205 (e.g., to the FL Tx 220). Such a feedback path can be used by the TT&C block 260 to send signal quality measurements and/or other information to the ground-based satellite control function.

As described below, the FL system 205 receives both DtD signals and control signals. The DtD signals can be formatted based on terrestrial wireless waveforms and protocols, such as 5G NR signals; and the control signals can be formatted based on satellite feeder-link waveforms and protocols, such as DVB-S2/S2X signals. In some implementations, the control signals are modulated by a robust DVB- S2/S2X modulation and coding in so-called constant code modulation (CCM) mode. The control signals (represented in FIG. 2 as dashed lines) are received by the control Rx 250, which is configured to receive and demodulate the control signals in accordance with its waveform formatting and protocols. Embodiments of the control Rx 250 can interface with the FL Rx 215 to receive the control signals. In some implementations, the control Rx 250 receives the control signals from the FL Rx 215 after the signals are down-converted and/or demodulated (e.g., DVB-S2 signals are typically modulated using quadrature phase shift keying (QPSK), 8 phase shift keying (8PSK) or other sophisticated modulation schema). In other implementations, the control Rx 250 receives the control signals from the FL Rx 215 prior to down-conversion and/or demodulation, and the control Rx 250 down-converts and/or demodulates the control signals.

Embodiments of the control Rx 250 can then perform error correction (e.g., based on low-density parity-check (LDPC) and/or Bose-Chaudhuri-Hocquenghem (BCH) codes) to mitigate the impact of channel impairments and noise during transmission, thereby helping to ensure the integrity of the received control data. Some embodiments can perform other types of processing, such as transport stream processing to extract relevant components from the control signal. Embodiments of the control Rx 250 also decode the demodulated and error-corrected control signal, effectively converting the received control signal into a stream of digital control data.

The down-converted, demodulated, and processed digital control data can be passed to the control processor 255, which can use the digital control data to perform several functions. In some embodiments, the control Rx 250 does not perform any or all of the above processing, and some or all of the above processing is performed, instead, by the control processor 255 prior to performing other functions. One function of the control processor 255 is to use the digital control data to coordinate with the TT&C block 260. Embodiments of the TT&C block 260 generally handle telemetry, tracking, and command functions. Telemetry functions can include collection of real-time data from portions of the architecture 200 (e.g., and/or other components of the satellite) and communication of that data with the GW-RUs 125. The data can include measurements of temperature, power consumption, system voltages, and/or other parameters as indications of satellite health, status, and performance. Tracking functions can include coordination with ground-based tracking (e.g., at the GW-RUs 125), which seek to monitor precise locations and orientations of the satellites 105. In some cases, tracking functions can also include one satellite's tracking of one or more other adjacent satellites (e.g., in the same plane, in an adjacent plane, etc.) in the same constellation. The control processor 255 is primarily concerned with control functions of the TT&C block 260, which can include receiving control commands from a satellite control facility on the ground to direct performance of specific actions or adjustments at the satellite. For example, the control commands can be used to control the satellite's orientation, power distribution, onboard system configurations, orbital maneuvers, etc.

Another function of the control processor 255 is to use the digital control data to direct beamforming and beam-hopping by the UL Tx DBF 235 and the UL Rx DBF 240. As described above, the UL system 225 can form user beams based on BHBP schema. As used herein, a particular BHBP scheme defines a set of complex beamforming weights for each element which, when applied by the UL Tx DBF 235 and/or the UL Rx DBF 240 to signals going to and/or coming from radiating elements of the UL BF antenna 230, will result in a respective deterministic set of formed user beams of particular sizes, shapes, and locations on the ground (based on the current position and orientation of the satellite). In some embodiments, the control processor 255 computes the BHBF schema to direct beamforming and beam-hopping by the UL Tx DBF 235 and/or the UL Rx DBF 240. In such cases, the control data received by the control processor 255 can be used to perform the computations, such as by informing the control processor 255 of the present position and altitude of the satellite, the desired beam arrangement for the present time slot, etc.

In other embodiments, as illustrated, a large number of pre-computed BHBF schema are stored in a BHBF data store 265. For example, the BHBF schema can be stored as a lookup table, or in any other suitable manner. In such embodiments, the GW-RU 125 can dynamically perform beamforming computations to determine which of the pre-computed BHBF schema is most appropriate (e.g., is a best match) for any given satellite location and orientation, for any given time slot, etc. The GW-RU 125 can then use the control signal to send an identifier (e.g., an index) of the appropriate pre-computed BHBF schema to the satellite, and the control processor 255 can use the control signal to select the corresponding pre-computed BHBF schema from the BHBF data store 265. In some such embodiments, the GW-RU 125 can compute a forward-looking sequence of several pre-computed BHBF schema in accordance with the trajectory of the satellite, and/or other information; and the GW-RU 125 can send a sequence of corresponding identifiers to the satellite so that the control processor 255 can select appropriate pre-computed BHBF schema from the BHBF data store 265 in accordance with the sequence. In some embodiments, even when pre-computed BHBF schema are selected from the BHBF data store 265, the BHBF schema can be adjusted slightly (e.g., by the GW-RU 125 and communicated via the control signal, and/or by the control processor 255) to account for dynamic changes in signal quality, network requirements (e.g., surges in demand), etc.

In the forward direction, as shown in FIG. 2, the FL Rx 215 receives feeder uplink signals via the FL antenna 210, and the feeder uplink signals include DtD signals and control signals. The control signals are passed to the control system 245, as described above. The DtD signals can be passed through to the UL Tx DBF 235 for relay back down to user devices 140 as a user downlink signal via the UL BF antenna 230. No waveform processing is applied to the DtD signals, and the satellite acts essentially as a bent-pipe relay. In the return direction, the control signals perform the same functions as in the forward direction, (i.e., directing the BHBF to form receive beams in the correct directions at the correct times). Return uplink signals (from user devices 140) are received by the UL Rx DBF 240 via the UL BF antenna 230 and are passed through to the FL Tx 220 for relay back down to a currently active GW-RU 125 via the Fl antenna 210.

The architecture 200 of FIG. 2 assumes that there are no ISL signals or ISL links. For example, there can still be a large number of NGSO satellites 105 operating as a constellation in communication with a large number of geographically distributed GW-RUs 125; but the NGSO satellites 105 are unable to communicate directly with each other. As described with reference to FIG. 1, some embodiments described herein implement NTN communication systems that rely on NGSO satellites 105 having inter-plane and/or intra-plane ISLs, such as for maintaining continuous nearly global coverage.

Figure 3:
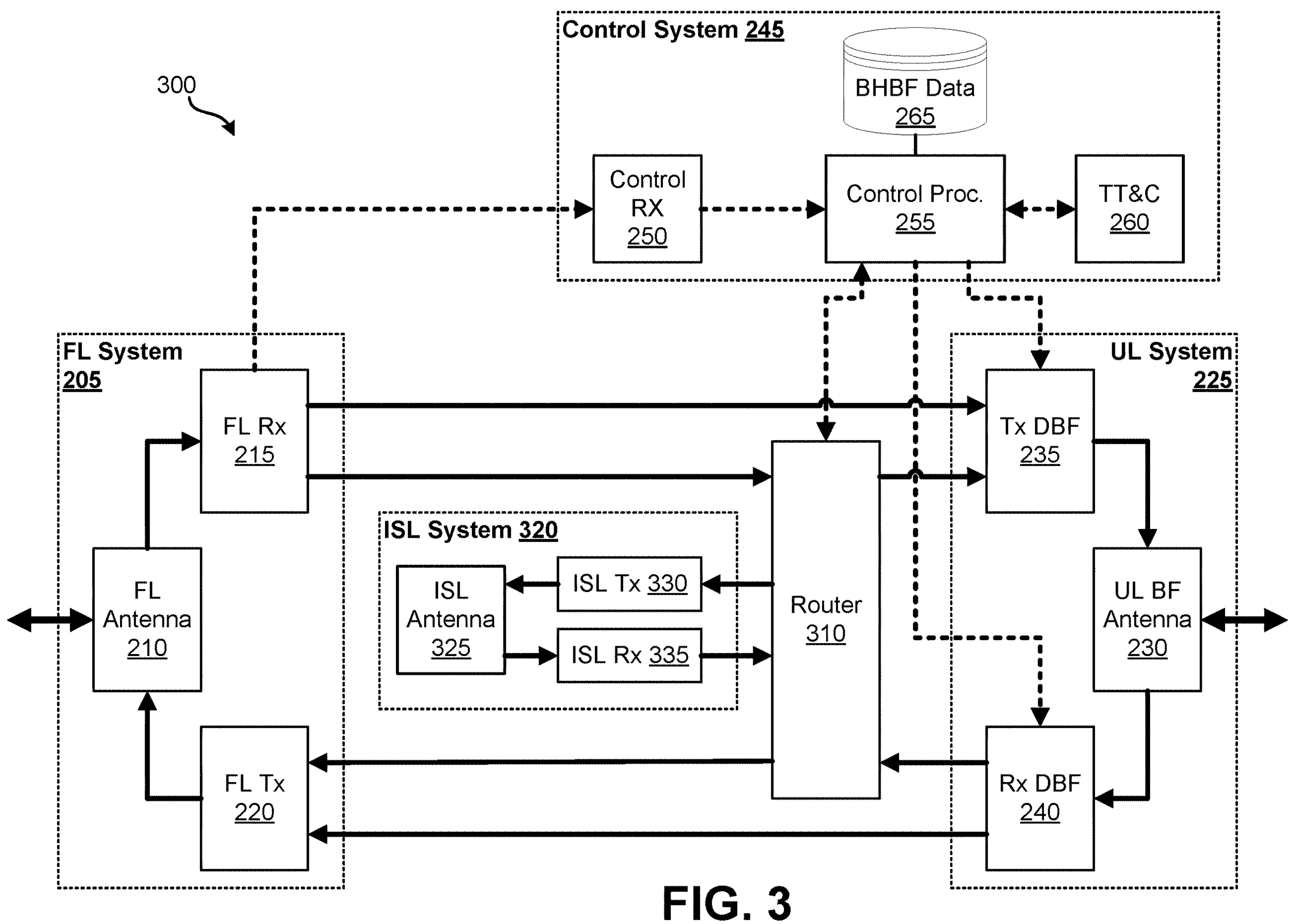
FIG. 3 shows a block diagram of a second illustrative on-board signal handling architecture that supports inter-satellite links (ISLs), according to some embodiments described herein.

FIG. 3 shows a block diagram of a second illustrative on-board signal handling architecture 300 that supports inter-satellite links (ISLs), according to some embodiments described herein. The architecture 300 can be implemented in one or more (e.g., or all) of the NGSO satellite(s) 105 of the NTN communication system 100 of FIG. 1. As in FIG. 2, the architecture 300 includes a FL system 205, a UL system 225, and a control system 245. Except as otherwise described, the FL system 205, the UL system 225, and the control system 245 include the same components and operate in the same manner as described above with respect to FIG. 2. As illustrated, the architecture 300 of FIG. 3 additionally includes a router 310 and an ISL system 320.

Embodiments of the ISL system 320 include an ISL transmitter (Tx) 330 and an ISL receiver (Rx) 335. Some embodiments of the ISL system 320 also include one or more ISL antennas 325. The ISL system 320 generally handles communications over one or more ISLs (e.g., inter-plane and/or intra-plane ISLs links) with one or more adjacent satellites in a same constellation, and the ISL antenna(s) 325 can include any antennas suitable for that purpose. For example, the ISL antenna(s) 325 can include a phased array antenna, parabolic reflector, or other antenna type. ISL signals sent over the ISLs can be in any suitable frequency range, such as in a typical satellite RF band (e.g., Ka-Band) or an optical band (e.g., using laser beams).

The ISL signals can be modulated and/or encoded in any suitable manner. In some embodiments, the ISL signals encode bits using On-Off-Keying (on if '1', off if '0'), or another digital encoding scheme, so that the ISL signals are considered digital signals. In such cases, the digital ISL signals can be converted from analog-to-digital signals (i.e., digitized) prior to transmission over an ISL, and/or they can be converted from digital-to-analog signals after reception over an ISL. In other embodiments, ISL signals can apply analog modulation to the waveform so that the ISL signals are considered analog signals. For example, data can be encoded onto an optical signals by modulating the intensity of a laser transmission. Embodiments of the ISL Tx 335 and the ISL Rx 340 are configured to perform some or all of the modulation, coding, and/or other processing (e.g., frequency conversion, filtering, amplifying, etc.) involved in converting signals into ISL signals for transmission and/or from ISL signal after receipt.

In general, the ISL signals carry data corresponding to a portion of the DtD signals. In some cases, because some of the ISL signals carry the same data as forward uplink waveforms received by the FL system 205, certain ISL signals may additionally carry data encoded in the control signals. In some implementations, control information is carried in-band as part of the ISL signal information (e.g., similar to the manner in which the control information is received on the feeder uplink waveform). In other implementations, the control information can be embedded in the ISL signal in packets, such as in header information, or in any other suitable manner. For example, such embedding may be used where the ISL signals are digitized prior to sending over the ISL link.

Embodiments of the router 310 include any suitable components to route signals between the FL system 205, the UL system 225, and the ISL system 320. For example, the router includes a switch fabric, a crossbar switch, a multi-stage interconnection network, a bus-based architecture, store-and-forward switching, output-buffered switching, time-division multiplexing (TDM), wavelength division multiplexing (WDM), packet switching, and/or any other suitable techniques. In some embodiments, the routing is in accordance with control data received from the control processor 255. For example, the control data is derived by the control processor 225 from received control signals.

Several scenarios can be considered. In a first scenario, the satellite receives a forward DtD signal from a currently active GW-RU 125 for relaying back down to one or more user devices 140 currently being served by user beams of the satellite. In this scenario, the FL Rx 215 receives the feeder uplink DtD signal via the FL antenna 210 and can pass the signal directly to the UL Tx DBF 235 for relay back down to user devices 140 as a user downlink signal via the UL BF antenna 230. In the illustrated architecture 300 of FIG. 3, the signal bypasses the router 310. In an alternative implementation, all signals are passed through the router 310. In such an alternative implementation, the FL Rx 215 receives the feeder uplink DtD signal via the FL antenna 210 and passes the signal to the router 310, which can forward the signal to the UL Tx DBF 235 for relay back down to user devices 140 as a user downlink signal via the UL BF antenna 230.

In a second scenario, the satellite receives a return DtD signal from one or more user devices 140 currently being served by user beams of the satellite for relaying back down to a currently active GW-RU 125. In this scenario, a return uplink DtD signal is received by the UL Rx DBF 240 via the UL BF antenna 230 and is passed directly to the FL Tx 220 for relay back down to a currently active GW-RU 125 via the FL antenna 210. In the alternative implementation described in the preceding paragraph, the return uplink DtD signal is received by the UL Rx DBF 240 via the UL BF antenna 230 and is passed to the router 310, which can forward the signal to the FL Tx 220 for relay back down to a currently active GW-RU 125 via the FL antenna 210.

In a third scenario, the satellite receives a control signal from a currently active GW-RU 125 on the forward uplink. In this scenario, the FL Rx 215 receives the control signal via the FL antenna 210 and can pass the signal directly to the control system 245.

In a fourth scenario, the satellite receives a forward DtD and/or control signal from a currently active GW-RU 125 for relaying through at least one hop via an ISL link to another satellite. In a fifth scenario, the satellite receives a return DtD signal from one or more currently served user devices 140 for relaying through at least one hop via an ISL link to another satellite. In these two scenarios, an analog signal is received (either the FL Rx 215 receives a feeder uplink signal via the FL antenna 210, or the UL Rx DBF 240 receives a user uplink signal via the UL BF antenna 230), and the analog signal is passed to the router 310. The router 310 routes the signal to the ISL Tx 330, which prepares the signal, as appropriate, for communication over the ISL and transmits the signal over the ISL via the ISL antenna 325. For example, in cases where the ISL is designed for digital ISL signals, the router 310 or the ISL Tx 330 can digitize the analog signal into a properly formatted digital ISL signal.

In a sixth scenario, the satellite receives an ISL signal from another satellite via the ISL link. In this scenario, the ISL Rx 335 receives the signal via the ISL antenna 325 and forwards the signal to the router 310. The router 310 can then determine (e.g., based on its own control data, or based on control data received via the ISL) an appropriate routing for the signal based on the signal's destination. If the received ISL signal is a forward signal destined for one or more user devices 140 currently being served by the receiving satellite, the router 310 can forward the signal to the UL Tx DBF 235 for sending down to user devices 140 as a user downlink signal via the UL BF antenna 230. If the received ISL signal is a return signal destined for the currently active GW-RU 125 of the receiving satellite, the router 310 can forward the signal to the FL Tx 202 for sending down to the GW-RU 125 as a feeder downlink signal via the FL antenna 210. In these two cases, the ISL Rx 335 and/or router 310 can convert the signal, as needed, for sending as an analog signal over the feeder or user downlink. For example, if the received ISL signal is a digital signal, the signal can be converted back to an analog signal prior to forwarding to the FL system 205 or the UL system 225. If the received ISL signal is a forward or return signal destined for another hop via another ISL to another satellite (i.e., a third satellite), the router 310 can forward the signal to the ISL Tx 330 for sending over another ISL via the same or a different ISL antenna 325.

As described herein, an NGSO satellite 105 designed according to the transparent architecture 300 of FIG. 3 can be part of a constellation of such satellites. As one example, a satellite constellation can include 200 satellites arranged in 25 orbital planes with 8 satellites in each orbital plane, each orbiting at an altitude of approximately 674 km. The constellation has a 54-degree inclination and uses optical intra-plane ISLs with up to three hops to provide nearly complete global coverage. For example, the constellation may communicate with 41 gateways (GW-RUs) that are geographically distributed around the globe, each designed for a minimum elevation angle of 15 degrees. In the illustrative constellation, each satellite is designed to have an antenna effective isotropic radiated power (AEIRP) of at least 64 dbW, an antenna gain to noise temperature ratio (G/T) of at least 9 dB/K, at least 1,000 Watts of radiated RF power, and a mass of approximately 750 to 1,000 kilograms. Each satellite has a digital beamforming phased array antenna capable of forming 128 active beams (at a time) at 5 MHz per beam. For example, each satellite can be responsible for illuminating thousands of cells in its satellite coverage area, but the satellite can only form 128 active beams at a time. As such, the BHBF schema define both beamforming and a beam-hopping schema. The beam-hopping schema facilitate time sharing (e.g., time-division multiplexing) of the satellite's bandwidth and power by hopping the active beams to different locations in the satellite coverage area in each of a sequence of time slots; so that over each iteration of the sequence of time slots, thousands of beam coverage areas within the satellite coverage area can be illuminated.

The various components of the architectures 200 and 300 illustrated in FIGS. 2 and 3 can be implemented in any suitable manner. In some implementations, one or more of the components is implemented as a circuit using discrete components. In some implementations, one or more of the components (e.g., the control processor 255, the router 310, etc.) are implemented using any suitable one or more processors. For example, such components can include a central processing unit CPU, an application-specific integrated circuit (ASIC), an application-specific instruction-set processor (ASIP), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. In some implementations, one or more of the components is implemented by using one or more processors to execute processor-readable instructions stored on a non-transitory, processor-readable medium. Though not explicitly shown, the architectures 200 and 300 illustrated in FIGS. 2 and 3 can include any suitable non-transitory, processor-readable storage for storing such instructions.

Modern terrestrial wireless communication systems tend to allocate network resources (e.g., bandwidth) to user devices 140 based on a fundamental unit, referred to as a resource block (RB). According to 4G/LTE, 5G NR, and other standard and protocols, each RB is essentially a fundamental unit of radio resource allocation within the time and frequency domain, as enabled by the OFDMA downlink (i.e., forward) modulation scheme. In the frequency domain, each RB corresponds to a chunk of available bandwidth (e.g., typically a contiguous set of sub-carriers, a subchannel, etc.). The term "subchannel" is used herein to avoid potential confusion with 5G "sub-carriers." The number of subchannels in each RB can depend on channel bandwidth, subcarrier spacing, and/or other factors. Many 5G NR deployments use 5 MHz RBs, but other suitable frequency dimensions can be used (e.g., 10 MHz, 20 MHz, etc.). In the time domain, each RB corresponds to a duration of time. For example, 5G NR defines a time-frequency grid made up of frames, which are divided into sub-frames, which are further divided into slots. Typically, the sub-frame duration and the number of slots per sub-frame defines the slot duration, which effectively defines the time duration of each RB. In essence, use of RBs allows the network to allocate network resources in a dynamic manner that is flexible in both the time and frequency dimensions. For example, allocation of RBs can be dynamically adjusted to account for dynamic changes in traffic conditions and/or other conditions impacting supply and demand of network resources.

Embodiments described herein adopt the concept of RBs at least to facilitate compatibility between the novel types of NTN architectures described herein and user devices 140 that are configured to operate with cellular communication infrastructures, such as 4G/LTE and 5G NR. Though the term "RB" is used in context of embodiments herein, the term is not intended to be restricted to the types of RBs available in 4G/LTE and 5G, or even to OFDM modulation contexts; rather, the term is intended broadly to include any suitable type of network resource allocation that is compatible with the standards and protocols of a terrestrial communication infrastructure being extended for the type of satellite-based NTN infrastructure described herein.

Figure 4A:
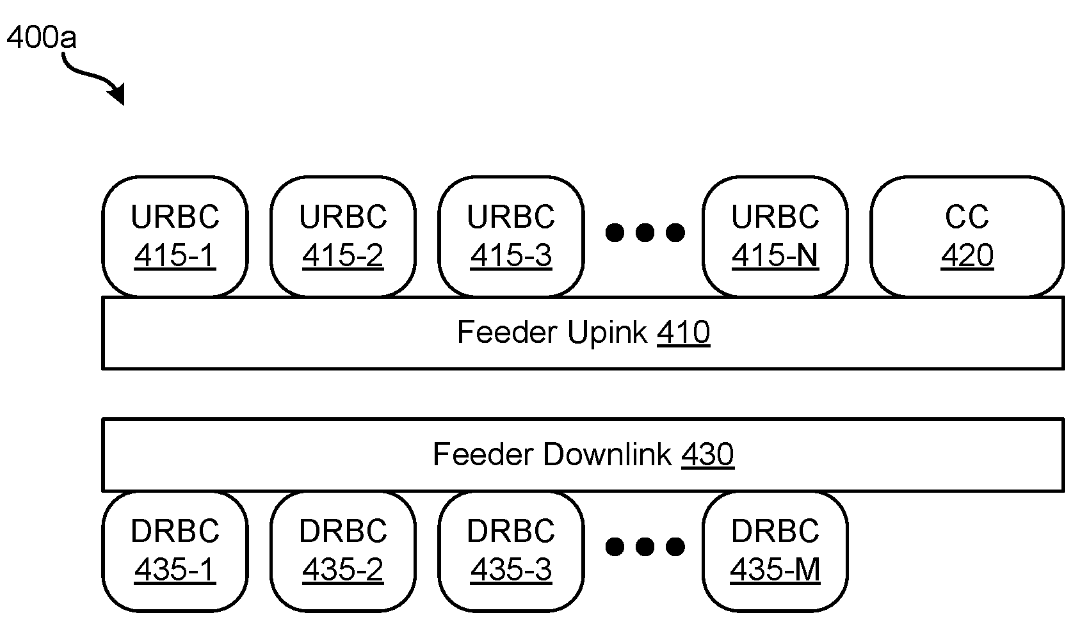
FIGS. 4A and 4B show two illustrative feeder-link frequency plans for use with transparent satellite-based NTN infrastructures, according to embodiments described herein.
Figure 4B:
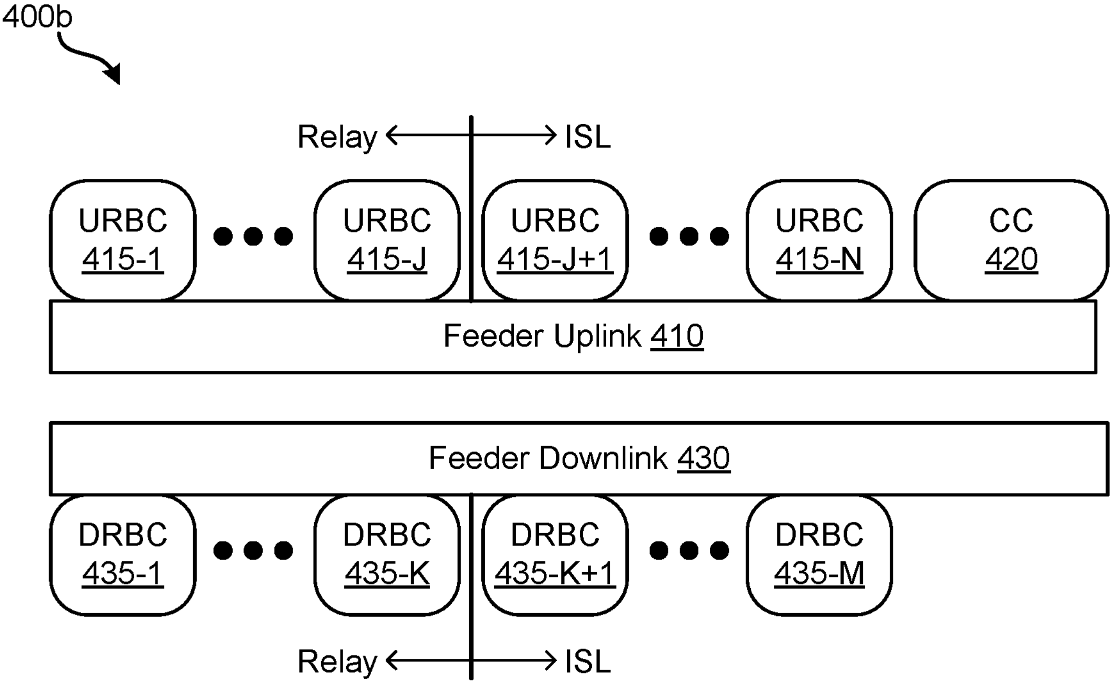

FIGS. 4A and 4B show two illustrative feeder-link frequency plans 400 for use with transparent satellite-based NTN infrastructures, according to embodiments described herein. As described above, embodiments of the NTN architecture seek to interface with user devices 140 using their existing capability to interface with cellular networks. As such, it is desirable to architect the network so that the user downlink signals (i.e., to be sent from the satellite 105 to the user devices 140) correspond to allocated RBs, in accordance with whatever cellular network standards and protocols are supported by the user devices 140. For example, it may be desirable to architect the network so that the satellite is transmitting 5 MHz signals on the forward user beams (i.e., on the user downlinks) in accordance with 5 MHz RBs as supported by 5G NR.

Also as described above, because of the transparent nature of the satellite architecture, the formatting of the feeder uplink signals by the ground-based NodeB 120 determines the type of user downlink signals that will be sent back down to the user devices 140 (i.e., the satellite is essentially a bent-pipe relay without any additional waveform processing on-board). As such, embodiments of the NTN architecture are designed so that the ground-based NodeB 120 formats the feeder link waveforms to provide the desired user link waveforms. In particular, embodiments segment the feeder-link carrier into subchannels, each having a frequency dimension corresponding to an RB allocation (e.g., 5 MHz). Forward and return DtD signals are assigned to respective ones of the subchannels.

Each of the feeder-link subchannels is referred to herein as a resource block channel (RBC). Each RBC can be an uplink RBC (URBC 415, corresponding to a subchannel, or RB allocation, of the forward uplink 410) or a downlink RBC (DRBC 435, corresponding to a subchannel, or RB allocation, of the forward downlink 430). As illustrated in FIGS. 4A and 4B, there can be N URBCs 415 and M DRBCs 435, where N and M are positive integers. In some implementations, N and M are the same. In one implementation, the feeder uplink 410 uses one carrier (e.g., one frequency range) and the feeder downlink 430 uses a different carrier. In another implementation, the feeder uplink 410 uses one polarization orientation (e.g., right-hand circular polarization, RHCP), and the feeder downlink 430 uses an orthogonal polarization orientation (e.g., left-hand circular polarization, LHCP). In another implementation, interference between the feeder uplink 410 and the feeder downlink 430 is mitigated using time-division and/or other techniques. Each forward DtD signal (i.e., not the control signals) can be assigned to a respective URBC 415, and each return DtD signal can be assigned to a respective DRBC 435. As such, in some embodiments, each forward user beam to be formed by the UL system 225 of a NGSO satellite 105 corresponds to a respective URBC 415, and each return user beam to be formed by the UL system 225 of the NGSO satellite 105 corresponds to a respective DRBC 435. The URBCs 415 and the DRBCs 435 can also be separated by a subchannel spacing (e.g., 0.5 MHz, 1 MHz, 3 MHz, etc.).

A portion of the feeder uplink 410 bandwidth can also be allocated to a control channel (CC) 420 for carrying the control signal. The control signal is used only by the satellite 105, and therefore it is unnecessary to match the CC 420 dimension to that of an RB (i.e., the frequency dimension of the CC 420 can be the same as, greater than, or smaller than that of the RBCs). In some implementations, each RBC corresponds to a respective 5 MHz subchannel, the CC 420 corresponds to a respective 15 MHz subchannel. In one such implementation, the carrier spacing between all subchannels is 0.5 MHz; the feeder uplink 410 is segmented into 160 URBCs 415 (i.e., N=160) and one CC 420, occupying 895 MHz (i.e., [(5+0.5)*160)]+15); and the feeder downlink is segmented into 160 DRBCs 435 (i.e., M=160) with no CC 420, occupying 880 MHz (i.e., (5+0.5)*160). In a second such implementation, the feeder uplink 410 includes two orthogonal polarization orientations, RHCP and LHCP. In the LHCP portion, the feeder uplink 410 is segmented into 96 URBCs 415, including three sets of 32 URBCs 415, wherein each of the URBCs 415 within each set is separated from its neighboring URBC(s) 415 by a 1-MHz carrier spacing, and each of the three sets is separated from its neighbor(s) by a 3 MHz carrier spacing, thereby occupying 579 MHz (i.e., 3*((32*5)+(31*1))+(2*3)=579). The RHCP portion of the feeder uplink 410 can also be segmented into 96 URBCs 415 (i.e., N=96+96=192) in the same manner with the addition of one CC 420 separated by another 3-MHz guard band, thereby occupying 597 MHz (i.e., 579+15+3). Thus, this second implementation can multiplex 192 URBCs 415 (i.e., N=96+96=192) into approximately 600 MHz of feeder uplink bandwidth. According to such frequency plans 400, the NodeB 120 (e.g., and the GW-RU 125) format the feeder uplink and downlink waveforms on the ground into analog feeder-link waveforms carrying the DtD (e.g., 5G NR) waveforms as subchannels. Further, time-division techniques are used to assign DtD signals to appropriate RBCs in appropriate time slots to so that the correct DtD signals will be sent to the correct beam coverage areas at the correct times in coordination with the BHBF schema.

Each frequency plan 400 shows N URBCs 415-1-415-N and N DRBCs 435-1-435-N. In satellite architecture embodiments that support ISLs, such as architecture 300 of FIG. 3, a first portion of the URBCs 415 and a second portion of the DRBCs 435 can be allocated to relay channels that will be relayed through the satellite between the FL system 205 and the UL system 225 (e.g., directly or through the router 310), and a third portion of the URBCs 415 and a fourth portion of the DRBCs 435 can be allocated to ISL channels for routing at the satellite to or from corresponding ISLs (via the router 310). In some embodiments, the first and second portions are the same (i.e., the same number of URBCs 415 and DRBCs 435 is allocated to relay channels), and the third and fourth portions are the same (i.e., the same number of URBCs 415 and DRBCs 435 is allocated to ISL channels). In other embodiments, some or all of the different portions can have different numbers of RBCs.

In some embodiments, the allocations of RBCs to relay channels and ISL channels are flexible. Turning to FIG. 4A, a first frequency plan 400*a* shows all of the RBC as agnostic to whether they are assigned to relay channels or ISL channels. In such embodiments, the control signal sent over the CC 420 can tell the router 310 at the satellite 105 which of the RBCs are carrying signals for routing to or from the ISLs, and which of the RBCs are carrying signals for routing to or from the UL system 225. Such a configuration enables flexible assignment of relay and ISL channels, such as to account for dynamic changes in demand for such channels. For example, a particular satellite 105 may tend to have more need for ISL channels in timeframes when traversing certain portions of its orbital path, and less need otherwise, so that it can be desirable to allocate a larger portion of the RBCs to ISL channels in those timeframes.

In other embodiments, the allocations of RBCs to relay channels and ISL channels are fixed (e.g., there is a rigid boundary). Turning to FIG. 4B, a second frequency plan 400*b* shows the RBC as divided into “Relay” and “ISL” channels. As illustrated, the N URBCs 415 are divided into a first portion (URBCs 415-1-415-J) for relay channels and a second portion (URBCs 415-J+1-415-N) for ISL channels, and the M DRBCs 435 are divided into a third portion (DRBCs 435-1-435-K) for relay channels and a fourth portion (DRBCs 435-K+1-435-M) for ISL channels. In some embodiments, J and K are equal, such that the same number of RBCs is allocated to relay channels in the forward and return directions. In some embodiments, M and N are also equal, such that the same number of RBCs is allocated to ISL channels in the forward and return directions. Such an approach can simplify routing at the satellite 310 at the expense of reduced flexibility in allocating relay and ISL channels.

Figure 5:
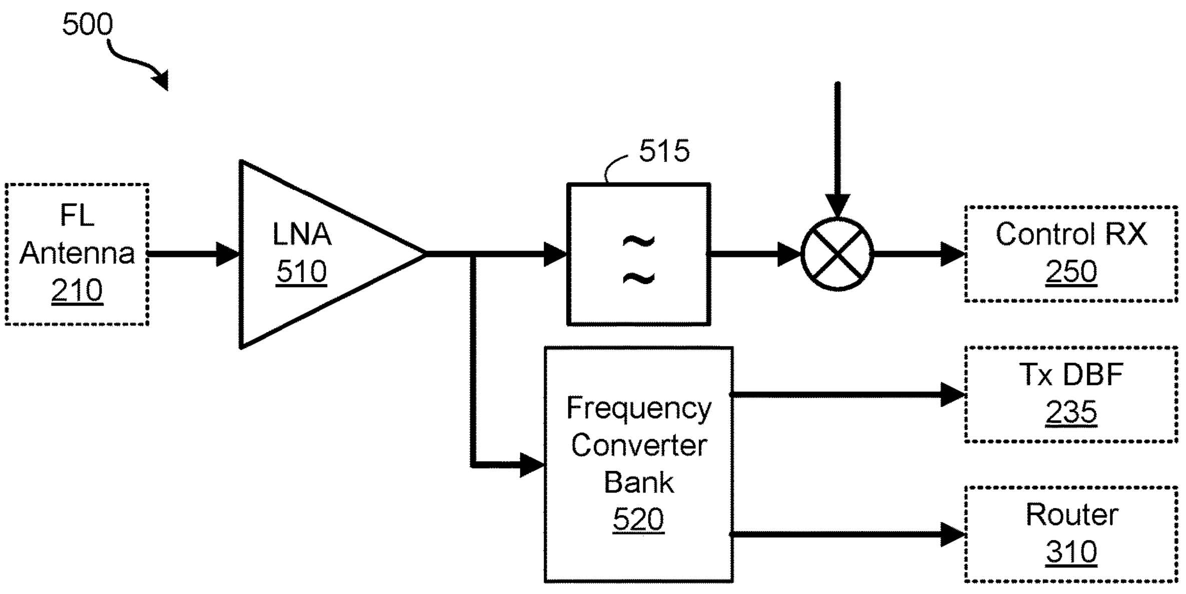
FIG. 5 shows a simplified circuit block diagram of an illustrative implementation of a feeder-link receiver (FL Rx).
Figure 6:
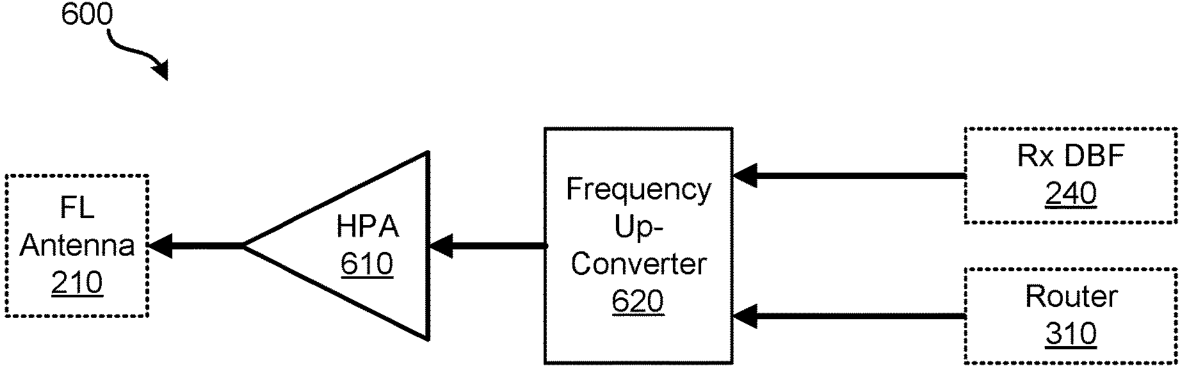
FIG. 6 shows a simplified circuit block diagram of an illustrative implementation of a feeder-link transmitter (FL Tx).

In either frequency plan 400, it can be seen that a single feeder uplink 410 effectively multiplexes N forward DtD signals on respective URBCs 415 of an analog uplink waveform and effectively multiplexes M return DtD signals on respective DRBCs 435 of an analog downlink waveform. FIGS. 5 and 6 shows example implementations of FL system 205 components at the satellite 105 to support communication of those feeder-link waveforms.

FIG. 5 shows a simplified circuit block diagram of an illustrative implementation of a feeder-link receiver (FL Rx)

500. The FL Rx 500 of FIG. 5 can be an implementation of the FL Rx 215 of FIG. 3. As illustrated, the FL Rx 500 can include an LNA 510, a bandpass filter 515, and a frequency converter bank 520. The FL antenna 210, control Rx 250, Tx DBF 235, and router 310 of FIG. 3 are shown for context. In accordance with FIGS. 4A and 4B, an analog feeder uplink waveform is received via the FL antenna 210; the received waveform multiplexes forward DtD signals onto N URBCs 415 and a control signal onto a CC 420. The waveform can be received via the LNA 510 (e.g., to account for atmospheric attenuation, path loss, etc.). As illustrated, the amplified waveform is sent both to the bandpass filter 515 and the frequency converter bank 520. The bandpass filter 515 can effectively separate out the CC 420 to isolate the control signal, modulate the control signal as needed (represented generally by a summer node), and forward the control signal to the control Rx 250. For example, the control signal is modulated and received as a DVB-S2/S2X signal that is modulated and encoded according to a constant code modulation (CCM) mode. The frequency converter bank 520 can isolate and down-convert each of the URBCs 415, so that each can be sent as a corresponding user-link (e.g., S-band) waveform with a frequency dimension and user-link subchannel corresponding to an RB compatible with receipt by the user devices 140. In some embodiments, all user-link waveforms are sent to the router 310, and the router determines whether to rout the waveforms to the UL system 225 (i.e., to the Tx DBF 235) or to the ISL system 320. In other embodiments, as illustrated, an appropriate portion of the user-link waveforms is sent to the UL system 225 (i.e., to the Tx DBF 235), and the remaining portion of the user link waveforms is sent to the router 310 for routing to the ISL system 320.

FIG. 6 shows a simplified circuit block diagram of an illustrative implementation of a feeder-link transmitter (FL Tx) 600. The FL Tx 600 of FIG. 6 can be an implementation of the FLTtx 220 of FIG. 3. As illustrated, the FL Tx 600 can include an HPA 610 and a frequency up-converter 620. The FL antenna 210, Rx DBF 240, and router 310 of FIG. 3 are shown for context. In accordance with FIGS. 4A and 4B, an analog feeder downlink waveform is transmitted from the satellite via the FL antenna 210; the transmitted waveform multiplexes return DtD signals onto M DRBCs 435. Multiple user uplink signals are received as analog waveforms by the frequency up-converter 620. One portion of the signals is received from respective user uplink channels via the Rx DBF 240, and another portion of the signals is received from one or more ISLs via the router 310 (e.g., or both portions of the signals are received via the router 310). The frequency up-converter 620 frequency-converts each user-link signal to a respective subchannel of the feeder downlink 430 associated with an appropriate respective one of the DRBCs 435, thereby effectively multiplexing all the user-link signals onto the feeder downlink waveform. The feeder downlink waveform can then be amplified by the HPA 610 to account for atmospheric attenuation, path loss, and the like in the downlink path.

Figure 7:
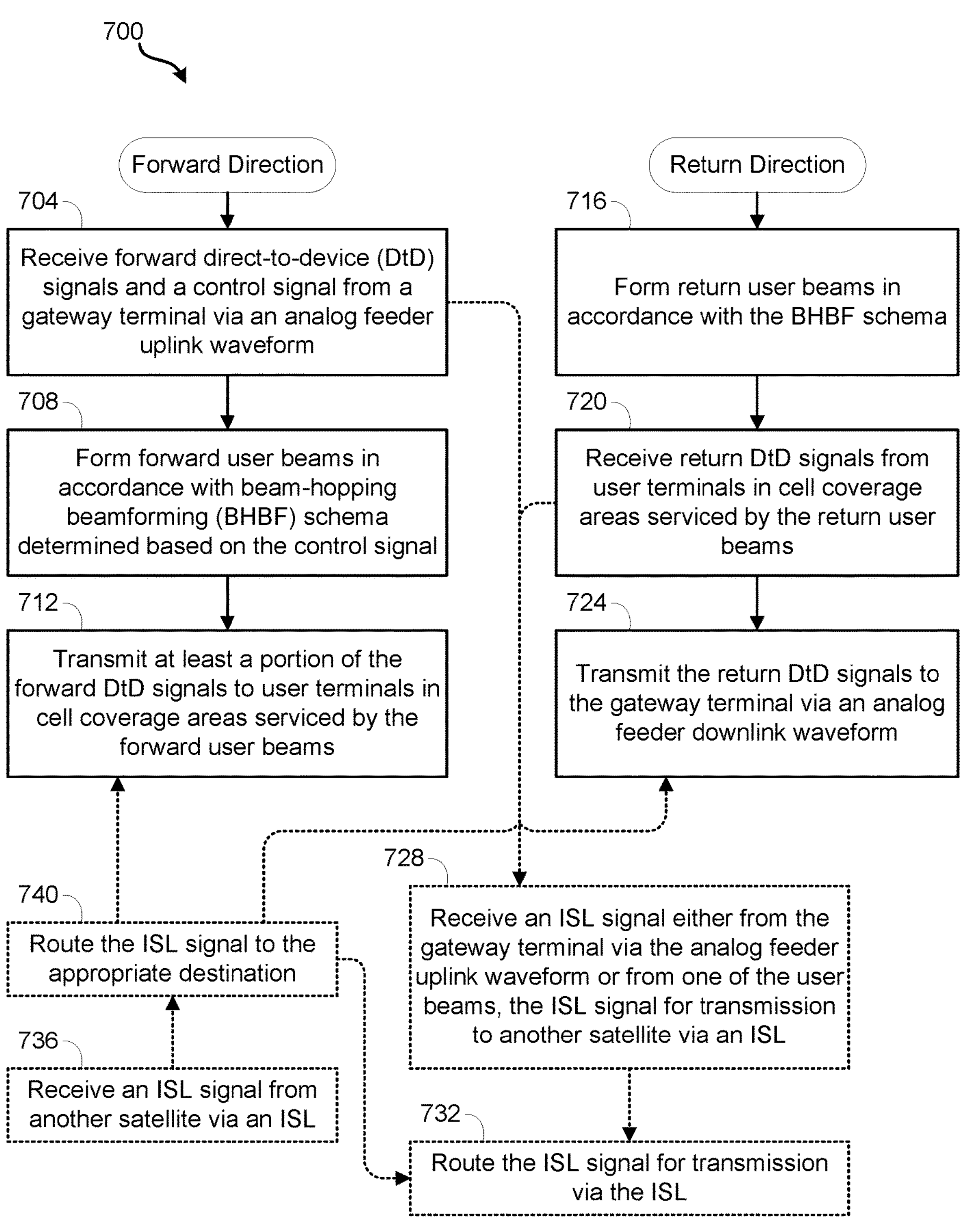
FIG. 7 shows a flow diagram of an illustrative method for non-terrestrial network communications via a non-processing non-geosynchronous orbit (NGSO) satellite, according to various embodiments described herein.

FIG. 7 shows a flow diagram of an illustrative method 700 for non-terrestrial network communications via a non-processing non-geosynchronous orbit (NGSO) satellite, according to various embodiments described herein. Embodiments of the method 700 include a "forward" communications portion and a "return" communications portion. The forward communications portion of the method 700 can begin at stage 704 by receiving (e.g., by the satellite from a GW-RU) forward direct-to-device (DtD) signals and a control signal via an analog feeder uplink waveform. At stage 708, embodiments can form forward user beams in accordance with beam-hopping beamforming (BHBF) schema determined based on the control signal. At stage 712, embodiments can transmit at least a portion of the forward DtD signals (i.e., the relay channel portion, and not the ISL channel portion) from the satellite to user terminals in cell coverage areas serviced by the forward user beams.

The return communications portion of the method 700 can begin at stage 716 by forming return user beams in accordance with the BHBF schema. A stage 720, embodiments can receive return DtD signals from user terminals in cell coverage areas serviced by the return user beams. At stage 724, embodiments can transmit the return DtD signals by the satellite to the GW-RU via an analog feeder downlink waveform.

In some embodiments, as described herein, the analog feeder uplink waveform is segmented into uplink resource block channels (URBCs). Each URBC can correspond to a respective subchannel of a feeder uplink, and each forward DtD signal can be received via a respective one of the URBCs. Similarly, the analog feeder downlink waveform is segmented into downlink resource block channels (DRBCs). Each DRBC can correspond to a respective subchannel of a feeder downlink, and each forward DtD signal can be received via a respective one of the URBCs. In some embodiments, each forward DTD signal and each return DtD signal is formatted for compatibility with a cellular networking protocol (e.g., as a OFDM signal formatted according to 5G NR protocols. In such embodiments, each URBC and each DRBC can have a frequency dimension corresponding to a resource block allocation defined by the cellular networking protocol. In some embodiments, the analog feeder uplink waveform is further segmented into a control channel corresponding to an associated subchannel of the feeder uplink separate from the URBCs, and the control signal is received via the control channel.

In some embodiments, the forward and/or return communications through the satellite further include inter-satellite link (ISL) communications with other satellites in a same constellation. For example, some embodiments, at stage 728, can receive an ISL signal by the satellite either from the GW-RU via the analog feeder uplink waveform or from one of the return user beams. The received ISL signal is for transmission to another satellite of constellation via an ISL. At stage 732, such embodiments can route the ISL signal for transmission to the other satellite via the ISL. Similarly, at stage 736, some embodiments can receive an ISL signal by the satellite from another satellite of the constellation via an ISL. At stage 740, such embodiments can routing the ISL signal, as appropriate, either for transmission to the GW-RU via the analog feeder downlink waveform, to one or more user terminals via one of the forward user beams, or to yet another satellite of the constellation via another ISL. As described above, routing of the ISL signals and/or the DtD signals can be directed at least partially by routing information received via the control signal.

Use of transparent mode satellite architectures to facilitate NTN deployments provides several features. One feature is that access to equipment on the ground simplifies interworking of the NB-IoT and NTN NR waveforms, as well as future standards updating. This can help roll out such a deployment, such as when consumer handsets, or other user devices supporting NTN NR, may not initially be available in large quantities. Another similar feature is that the use of analog feeder links in satellite bands with no terrestrial wireless-type (e.g., 5G NR) processing on board the satellite (i.e., there is only beam forming and ISL routing on-board)

tends to make the satellite design simpler and more robust. Another feature is that such approaches provide flexibility to scale capacity with more satellites or bandwidth as traffic demand increase in increments of the RBCs (e.g., in 5 MHz increments) per the terrestrial wireless protocols (e.g., in 5 MHz increments for 5G NR). Similarly, such an approach provides flexibility to improve coverage by adding additional GW-RUs as needed. Another feature is that the transparent nature of the DtD signal path means that the RBCs are agnostic to the types of waveforms being sent over them. For example, some of the RBCs can be used to carry 5G signals for consumer handsets, others can be used to carry IoT data for a wide variety of IoT devices, and others can be used to carry special waveforms to support proprietary uses by particular government and/or business customers.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. Components of a larger system, wherein other rules may take precedence over or otherwise modify the application of the invention. Also, a number of steps may be undertaken before, during, or after the above elements are considered.

What is claimed is:

1. A non-processing non-geosynchronous orbit (NGSO) satellite comprising:

a feeder link (FL) system having:

a FL receiver to receive, from a currently active gateway radio unit (GW-RU) via a FL antenna, analog forward direct-to-device (DtD) signals and a control signal; and a FL transmitter to transmit analog return DtD signals to the currently active GW-RU via the FL antenna; and a user link (UL) system having:

a transmit digital beamformer coupled with the FL receiver to:

form a plurality of forward user beams based on a beam-hopping beamforming (BHBF) schema determined based on the control signal; and transmit at least a portion of the forward DtD signals to user terminals in cell coverage areas serviced by the plurality of forward user beams via a UL beamforming antenna; and a receive digital beamformer coupled with the FL transmitter to:

form a plurality of return user beams based on the BHBF schema; and receive at least a portion of the return DtD signals from user terminals in cell coverage areas serviced by the plurality of return user beams via the UL beamforming antenna; and a control system comprising a control processor coupled with a control receiver to receive the control signal from the FL receiver, a BHBF data store having the BHBF schema stored thereon, and a telemetry tracking and control (TT&C) block to generate TT&C information, wherein the control receiver is at least to direct the transmit digital beamformer to form the plurality of forward user beams, and to direct the receive digital beamformer to form the plurality of return user beams based on the control signal, the BHBF schema, and the TT&C information.

2. The NGSO satellite of claim 1, wherein:

the FL receiver is to receive the forward DtD signals as an analog feeder uplink waveform segmented into uplink resource block channels (URBCs), each URBC corresponding to a respective subchannel of a feeder uplink; and the FL transmitter is to transmit the return DtD signals as an analog feeder downlink waveform segmented into downlink resource block channels (DRBCs), each DRBC corresponding to a respective subchannel of a feeder downlink.

3. The NGSO satellite of claim 2, wherein:

each forward DtD signal and each return DtD signal is formatted for compatibility with a cellular physical waveform and networking protocol; and each URBC and each DRBC has a frequency dimension corresponding to a resource block allocation defined by the cellular networking protocol.

4. The NGSO satellite of claim 2, wherein:

the analog feeder uplink waveform is further segmented into a control channel corresponding to an associated subchannel of the feeder uplink separate from the URBCs; and the FL receiver is to receive the control signal via the control channel.

5. The NGSO satellite of claim 4, wherein:

the control signal received via the control channel is formatted for compatibility with a DVB-S (Digital Video Broadcasting-Satellite) standard networking protocol; and the control receiver is a DVB-S receiver.

6. The NGSO satellite of claim 2, wherein:

the analog feeder uplink waveform is received in a first polarization orientation;

the analog feeder downlink waveform is received in a second polarization orientation concurrently with receiving the analog feeder uplink waveform; and the second polarization orientation is orthogonal to the first polarization orientation.

7. The NGSO satellite of claim 2, wherein:

a first portion of the analog feeder uplink waveform is received in a first polarization orientation and segmented into a first portion of the URBCs, and a second portion of the analog feeder uplink waveform is received in a second polarization orientation concurrently with receiving the first portion of the analog feeder uplink waveform and segmented into a second portion of the URBCs, and the second polarization orientation is orthogonal to the first polarization orientation.

8. The NGSO satellite of claim 1, wherein the satellite is one of a plurality of satellites of a satellite constellation, and further comprising:

an inter-satellite link (ISL) system having:

an ISL receiver to receive ISL signals via one or more ISLs via one or more ISL antennas from one or more others of the plurality of satellites; and an ISL transmitter to transmit ISL signals via the one or more ISLs via the ISL antenna to one or more others of the plurality of satellites.

9. The NGSO satellite of claim 8, wherein the ISL system further comprises the one or more ISL antennas.

10. The NGSO satellite of claim 8, further comprising:

a router coupled with the ISL system to perform ISL routing based on routing information received via the control signal by:

routing a received ISL signal, responsive to receiving the received ISL signal from the ISL receiver, either to the transmit digital beamformer for transmission via the UL beamforming antenna or to the ISL transmitter; and routing a transmit ISL signal to the ISL transmitter for transmission to another of the plurality of satellites via another of the ISLs responsive to receiving the transmit ISL signal from any of the FL receiver, the receive digital beamformer, or the ISL receiver.

11. The NGSO satellite of claim 10, wherein:

the routing the transmit ISL signal to the ISL transmitter comprises transmitting the ISL signal with a respective portion of the routing information indicating a destination satellite of the plurality of satellites for the ISL signal.

12. The NGSO satellite of claim 1, wherein:

the FL antenna comprises a plurality of FL antennas configured so that:

in a first timeframe, the currently active GW-RU is a first GW-RU having line-of-sight to the satellite as the satellite traverses an orbital path, and a first of the plurality of FL antennas is in communication with the first GW-RU;

in a second timeframe, the currently active GW-RU is a second GW-RU having line-of-sight to the satellite as the satellite traverses the orbital path, and a second of the plurality of FL antennas is in communication with the second GW-RU; and in a transition timeframe between the first timeframe and the second timeframe, while the currently active GW-RU continues to be the first GW-RU and the first of the plurality of FL antennas continues to be in communication with the first GW-RU, the second GW-RU also has line-of-sight to the satellite, and the second of the plurality of FL antennas establishes communication with the second GW-RU.

13. The NGSO satellite of claim 1, wherein:

the FL system further comprises the FL antenna; and the UL system further comprises the UL beamforming antenna.

14. A satellite-based non-terrestrial network (NTN) comprising:

a satellite constellation comprising a plurality of instances of the NGSO satellite of claim 1 traversing orbital paths in at least one orbital plane; and a plurality of gateway radio units (GW-RUs) in communication with the satellite constellation and with ground-based NodeBs that facilitate communications between the GW-RUs and a cellular core network, wherein the NGSO satellites are transparent-mode relays, and the NodeBs perform waveform processing on the forward DtD signals, the return DtD signals, and the control signal.

15. A method for non-terrestrial network communications via a non-processing non-geosynchronous orbit (NGSO) satellite, the method comprising:

in a forward direction:

receiving, by the satellite from a GW-RU, forward direct-to-device (DtD) signals and a control signal via an analog feeder uplink waveform;

forming a plurality of forward user beams based on a beam-hopping beamforming (BHBF) schema determined based on the control signal; and transmitting at least a portion of the forward DtD signals from the satellite to user terminals in cell coverage areas serviced by the plurality of forward user beams;

in a return direction:

forming a plurality of return user beams based on the BHBF schema;

receiving return DtD signals from user terminals in cell coverage areas serviced by the plurality of return user beams; and transmitting the return DtD signals by the satellite to the GW-RU via an analog feeder downlink waveform;

receiving, by a control system of the satellite, the control signal, wherein the control system comprises a BHBF data store having the BHBF schema stored thereon, and a telemetry tracking and control (TT&C) block to generate TT&C information;

directing, by the control system, the transmit digital beamformer to form the plurality of forward user beams based on the control signal, the BHBF schema, and the TT&C information; and directing, by the control system, the receive digital beamformer to form the plurality of return user beams based on the control signal, the BHBF schema, and the TT&C information.

16. The method of claim 15, wherein:

the analog feeder uplink waveform is segmented into uplink resource block channels (URBCs), each URBC corresponding to a respective subchannel of a feeder uplink, each forward DtD signal received via a respective one of the URBCs; and the analog feeder downlink waveform is segmented into downlink resource block channels (DRBCs), each DRBC corresponding to a respective subchannel of a feeder downlink, each forward DtD signal received via a respective one of the URBCs.

17. The method of claim 16, wherein:

each forward DtD signal and each return DtD signal is formatted for compatibility with a cellular physical waveform and networking protocol; and each URBC and each DRBC has a frequency dimension corresponding to a resource block allocation defined by the cellular networking protocol.

18. The method of claim 16, wherein:

the analog feeder uplink waveform is further segmented into a control channel corresponding to an associated subchannel of the feeder uplink separate from the URBCs; and the control signal is received via the control channel.

19. The method of claim 15, wherein the satellite is a first satellite of a plurality of satellites of a satellite constellation, and further comprising:

receiving an inter-satellite link (ISL) signal by the satellite either from the GW-RU via the analog feeder uplink waveform or from one of the plurality of return user beams, the ISL signal for transmission to a second satellite of the satellite constellation via an ISL between the first and second satellites; and routing the ISL signal for transmission to the second satellite via the ISL based on routing information received via the control signal.

* * * * *